Oct. 24, 1939.  J. W. WHITE  2,177,469
BRAKE
Filed Oct. 16, 1937  2 Sheets-Sheet 1
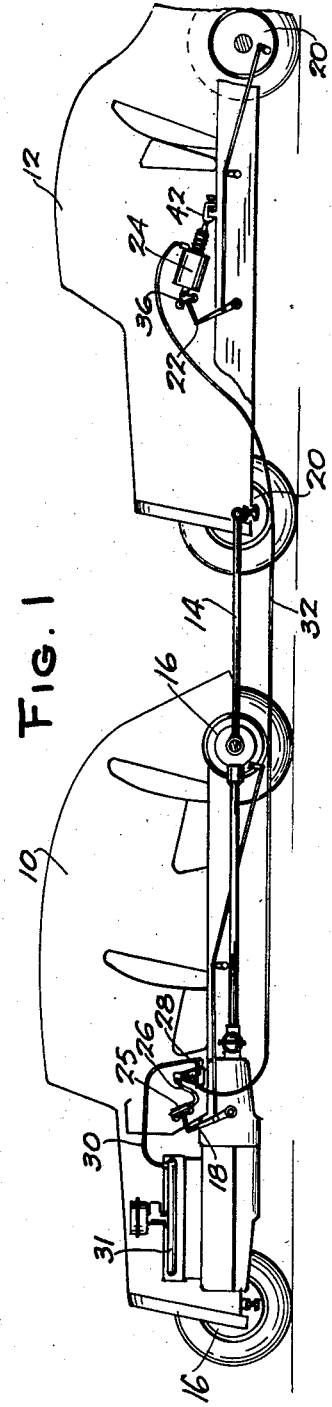
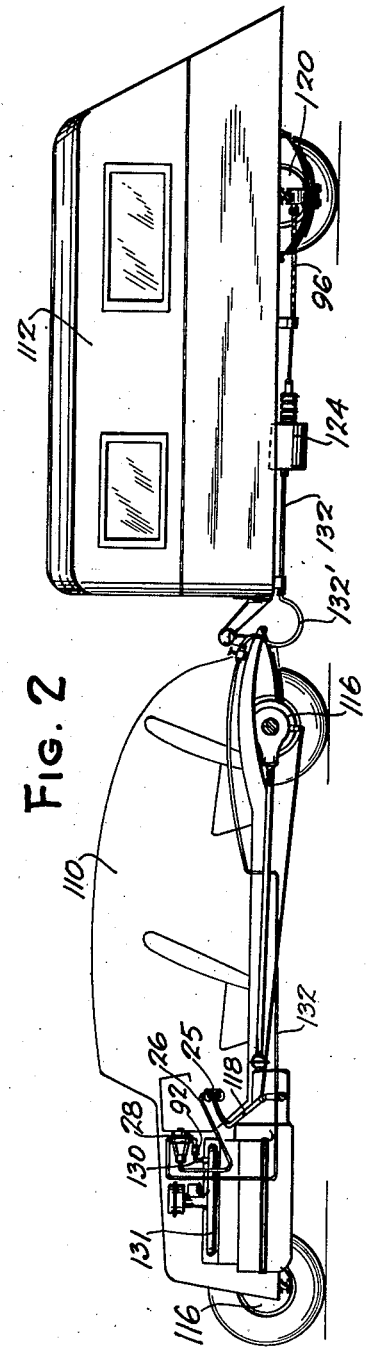
INVENTOR.
JOHN W. WHITE
BY Jerome R. Cox
ATTORNEY.

Oct. 24, 1939.          J. W. WHITE          2,177,469
BRAKE
Filed Oct. 16, 1937          2 Sheets-Sheet 2
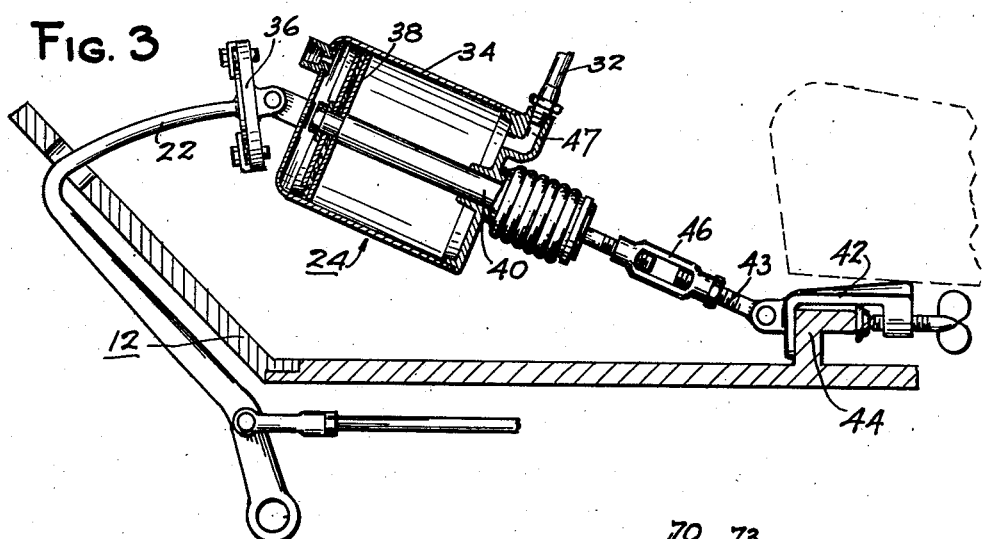
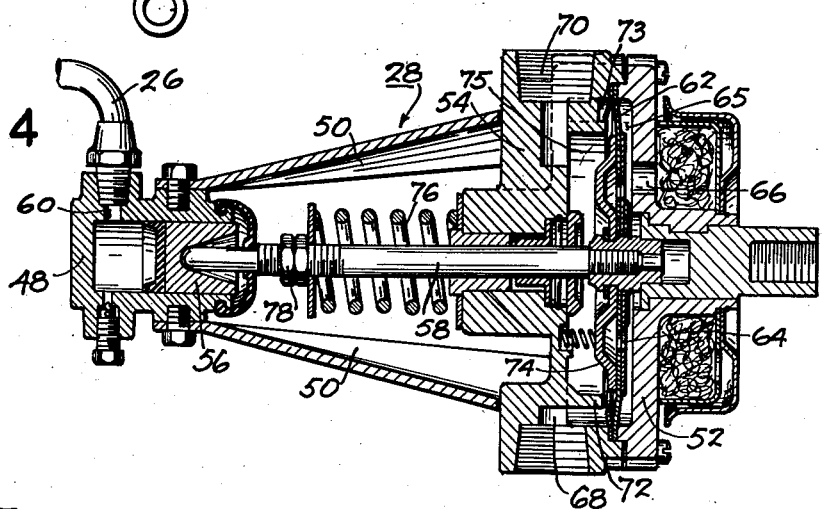
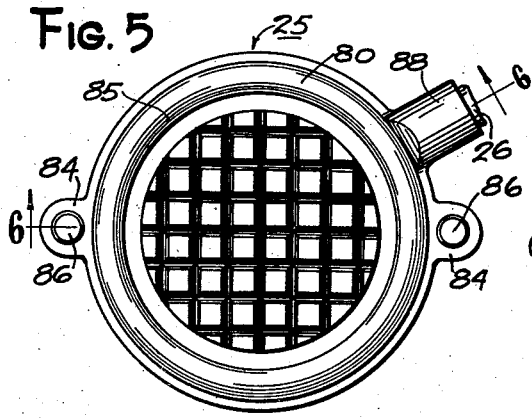
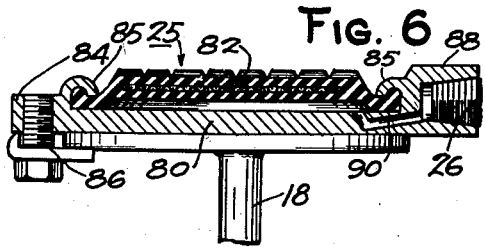
INVENTOR.
JOHN W. WHITE
BY Jerome R. Cox
ATTORNEY.

Patented Oct. 24, 1939

2,177,469

UNITED STATES PATENT OFFICE 2,177,469

BRAKE

John William White, South Bend, Ind., assignor to Bendix Products Corporation, South Bend, Ind., a corporation of Indiana Application October 16, 1937, Serial No. 169,339

4 Claims. (Cl. 188—3)

This invention relates to brakes and more particularly to brakes for trailers and towed vehicles.

An object of the invention is to provide apparatus for applying the brakes of a towed vehicle or trailer which is simple and easy to install.

A further object is to provide trailer or towed vehicle brake actuating mechanism which does not require modification of the braking system of the towing vehicle in order to be installed.

A third object is to provide a novel auxiliary hydraulic actuator to be mounted on the brake pedal of a vehicle to receive the foot pressure of the vehicle operator when the brakes are applied in the normal manner.

Another object is to arrange my novel actuator in conjunction with a hydraulically actuated vacuum valve whereby vacuum from the intake manifold of the towing vehicle is transmitted through suitable piping to a vacuum power cylinder arranged on the towed vehicle to apply the brakes thereof.

The above and other objects and desirable particular arrangements of parts will be apparent upon reference to the following detailed description of two embodiments of my invention shown in the accompanying drawings, in which:

Figure 1 is a diagrammatic view of two automobiles connected by a towing bar showing how my novel apparatus might be temporarily installed to enable the brakes of the towed automobile to be applied;

Figure 2 is a similar view of an automobile and a trailer showing my novel apparatus permanently installed for operation of the trailer brakes.

Figure 3 is a view on a larger scale and partly in section of the vacuum cylinder installed in the towed car of Figure 1;

Figure 4 is a longitudinal section through the hydraulically actuated vacuum valve used in my novel system;

Figure 5 is a front elevation of the novel hydraulic actuator used in my novel braking system; and Figure 6 is a section through the hydraulic actuator taken on the line 6—6 of Figure 5.

Referring to Figure 1, I have illustrated my novel system as used e. g. in making a so-called "drive-way" delivery of new cars from the factory. The towing car is designated by the numeral 10 and the towed car is designated by the numeral 12. They are connected together by a self-steering drawbar 14 of which many types are now well known.

The car 10 is provided with wheel brakes 16 adapted to be actuated in any desired manner (here illustrated as mechanical connections) by means of a pedal 18.

The car 12 is provided with wheel brakes 20 intended to be actuated by a pedal 22. As a part of my invention, I provide fluid pressure actuating means in the form of a "pusher" vacuum power actuator 24 connected to actuate the brake pedal 22 of the car 12 in a manner to be more fully described below.

My novel auxiliary hydraulic actuator or master cylinder 25, shown in Figures 5 and 6, is clamped to the brake pedal of the car 10 and a hydraulic pressure line 26 extends therefrom to a vacuum valve 28 which in this installation is merely laid on the floor of the car 10. A flexible tube 30 extends from the valve 28 to a source of vacuum which is conveniently found in the intake manifold 31 of the car 10. Although not illustrated, an easy connection to this source of vacuum may be made at the vacuum operated windshield wiper generally used in automobiles.

Another flexible tube 32 extends from the valve 28 out of the car 10 through any convenient opening and into the car 12 where it is connected to the actuator 24.

In Figure 3 I have illustrated one desirable form of vacuum power actuator 24 for use in the towed car and convenient means for installing it temporarily therein. The actuator comprises a cylinder 34 closed at both ends and provided at one end with a pivotally connected clamp 36 arranged to clamp to the foot pad or any other convenient portion of the pedal 22. Within the cylinder is a piston 38 provided with a piston rod 40 projecting through the other end of the cylinder 34 and provided at its outer end with a clamp 42 pivotally connected thereto and adapted to be clamped to a convenient fixed portion of the car 12 such as the usual front seat rail 44. I prefer to provide a turnbuckle adjustment 46 in the rod 43 in order to facilitate installation in cars of various types. A port 47 is provided in the piston rod end of the cylinder for connection to the vacuum line 32.

The vacuum valve 28 is shown in detail in Figure 4 and essentially comprises two major parts, a hydraulic cylinder 48 and a two-part valve body 52—54 connected together by brackets 50. The hydraulic cylinder contains a piston 56 adapted to actuate a valve stem 58 and is provided with a pressure line connection 60 to receive the line 26, above-mentioned, and with the usual bleed valve.

The two portions of the valve body hold clamped between them a diaphragm 62 perforated by an annular series of holes 64 and secured at its center to the valve stem 58 which projects into the valve body through suitable packings. The diaphragm divides the interior of the valve into right and left portions as seen in Figure 4, the right hand portion 65 which may be called the air chamber being provided with an atmospheric air port 66 and the left portion being provided with a vacuum port 68 and a cylinder port 70. These ports are separated by an annular flange 72 arranged in proximity to the diaphragm 62 and adapted to act as a valve seat for the diaphragm which acts as a valve to permit or prevent communication between the two ports. This flange in effect divides the left portion into two chambers, an annular vacuum chamber 73 outside the flange into which the vacuum port opens and a controlled pressure chamber 75 inside the flange into which the cylinder port opens.

A valve member in the shape of a circular disc 74 is also secured to the valve stem and is arranged to contact the diaphragm outside the annular series of holes 62 and inside the annular flange 72 and thereby to act as a valve to open or close communication between the air chamber and the controlled pressure chamber through said holes. A spring 76 is compressed between the left portion 54 of the valve body and a pair of adjustable nuts 78 to hold the valve stem to the left, in which position the diaphragm contacts the annular flange 72 to close communication between the vacuum chamber and the controlled pressure chamber, and the valve member or disc 74 is lifted from the diaphragm to permit entrance of atmospheric air to the controlled pressure chamber. This is the "off" position of the valve.

Figure 4 illustrates the "on" position in which the pressure in the hydraulic cylinder 48 moves the piston and valve stem to lift the diaphragm from the flange and presses the valve disc 74 against the diaphragm, thereby admitting vacuum to and excluding air from the controlled pressure chamber.

The vacuum in the controlled pressure chamber reacts on the diaphragm to balance the hydraulic pressure in the cylinder 48 and return the valve to lapped position, i. e. with both air and vacuum ports cut off, thereby providing a vacuum pressure proportionate to the hydraulic pressure.

Figures 5 and 6 illustrate my novel hydraulic master cylinder 25 which comprises a plate corresponding substantially in size and shape to the usual foot pad of a brake pedal and a rubber diaphragm 82 (which may be suitably reinforced with fabric or the like) secured marginally to the plate by a rolled over flange 85. I prefer to provide the outer surface of the diaphragm with a treadlike surface.

The plate 80 may be provided with two or more ears 84 to receive clamp screws 86, whereby the plate is securely fastened to the foot pad of the pedal 18. A boss 88 projecting from one side of the plate 80 is internally threaded to receive a fitting of the hydraulic pressure line 26, and a passage 90 leads therefrom to the space enclosed by the plate and diaphragm. When the apparatus is assembled, this space, the hydraulic pressure line 26 and the cylinder 48 of the vacuum valve 28 are filled with hydraulic fluid.

It will be seen that preparation of the cars 10 and 12 for drive-away delivery is very simple. The parts 24, 25, 26, 28, 30 and 32 are provided as a unit fully assembled, and with the hydraulic parts full of fluid. The hydraulic actuator 24 and vacuum power actuator 25 are clamped to the respective brake pedals, the valve 28 is disposed in any convenient position (but not attached) and the vacuum line 30 may, as before stated, be connected to the windshield wiper line or if desired directly to the manifold 31 (which is usually provided with one or more plugged openings), whereupon the braking system is ready to operate.

In operation, the driver of the car 10, desiring to apply the brakes presses his foot on the pedal 18 to which my novel master cylinder is attached. This pressure is transmitted through the master cylinder to depress the pedal 18 and apply the brakes of the car 10. At the same time pressure is created in the fluid in the master cylinder which is transmitted to the cylinder 48 of the vacuum valve. The piston 56 moves to the right to the position shown in Figure 3 cutting off the air ports 66 from the controlled pressure chamber and opening the vacuum port. Vacuum is then transmitted to the controlled pressure chamber and through the vacuum line 32 to the power cylinder 24 and depresses the pedal 22 to apply the brakes of the car 12.

The modification of Figure 2 differs from that of Figure 1 in that it is intended to be a more permanent installation for use with a house trailer or the like. In this modification identical parts have the same reference numerals while corresponding but slightly dissimilar parts are given the same reference numerals plus 100.

In this modification the valve 28 is preferably bolted to a fixed part of the car 110 such as the fire wall. The vacuum line between the valve and power cylinder 124 may be made with a portion 132 of more or less rigid copper tubing or the like permanently secured to the car, a flexible portion 132 detachably secured between the car and trailer 112 and another permanently installed rigid portion on the trailer 124. A cut-off valve 92 may be provided on the car to be closed when the trailer is unhooked.

The trailer is preferably provided with a "puller" type cylinder 124 arranged in any desired manner to actuate the brakes 120 of the trailer such as by means of a "Bowden" cable 96.

The operation of this arrangement is in all regards the same as that of Figure 1.

While I have illustrated and described two specific embodiments of my invention, it is not my intention to be limited to those embodiments or otherwise than by the terms of the appended claims.

I claim:

1. The combination, with a towing vehicle having a standard set of brakes and a pedal for actuating its brakes, and with a towed vehicle also having a standard set of brakes and a pedal for actuating its brakes and which is temporarily connected to the towing vehicle, of means for actuating the brakes of the towed vehicle when the brake pedal of the towing vehicle is actuated comprising a power device detachably engaged with the pedal of the towed vehicle and a control for said power device actuated by depression of the pedal of the towing vehicle.

2. The combination, with a towing vehicle having a standard set of brakes and a pedal for actuating its brakes, and with a towed vehicle having a set of brakes and which is temporarily connected to the towing vehicle, of means for actuating the brakes of the towed vehicle when the brake pedal of the towing vehicle is actuated comprising a power device operably connected with the brakes of the towed vehicle and a control for said power device detachably mounted on the pedal of the towing vehicle.

3. The combination, with a towing vehicle having a standard set of brakes and a pedal for actuating its brakes, and with a towed vehicle also having a standard set of brakes and a pedal for actuating its brakes and which is temporarily connected to the towing vehicle, of means for actuating the brakes of the towed vehicle when the brake pedal of the towing vehicle is actuated comprising a power device detachably engaged with the pedal of the towed vehicle and a control for said power device actuated by depression of the pedal of the towing vehicle, said power device comprising an extensible unit engaging the pedal of the towed vehicle at one end and engaging a fixed part of said vehicle at its other end.

4. The combination, with a towing vehicle having a standard set of brakes and a pedal for actuating its brakes, and with a towed vehicle having a set of brakes and which is temporarily connected to the towing vehicle, of means for actuating the brakes of the towed vehicle when the brake pedal of the towing vehicle is actuated comprising a power device operably connected with the brakes of the towed vehicle and a control for said power device detachably mounted on the pedal of the towing vehicle, said power device being a vacuum actuator and said control comprising a hydraulically operated vacuum-controlling valve and a compressible hydraulic actuator connected to said valve and mounted on the pedal of the towing vehicle.

JOHN WILLIAM WHITE.